United States Patent
Temple (10) Patent No.: US 11,419,261 B2
(45) Date of Patent: Aug. 23, 2022

(54) PRESCRIPTION COVER CROP SEEDING WITH COMBINE

(71) Applicant: DEERE & COMPANY, Moline, IL (US)

(72) Inventor: Douglas G. Temple, Fulton, IL (US)

(73) Assignee: DEERE & COMPANY, Moline, IL (US)

( * ) Notice: Subject to any disclaimer, the term of this patent is extended or adjusted under 35 U.S.C. 154(b) by 272 days.

(21) Appl. No.: 16/017,058

(22) Filed: Jun. 25, 2018

(65) Prior Publication Data

US 2019/0387668 A1  Dec. 26, 2019

(51) Int. Cl.
*A01C 21/00* (2006.01)
*A01D 41/127* (2006.01)

(52) U.S. Cl.
CPC ........ *A01C 21/007* (2013.01); *A01D 41/1272* (2013.01); *A01D 41/1277* (2013.01)

(58) Field of Classification Search
CPC ..... A01C 21/007; A01C 21/005; A01C 14/00; A01C 21/002; A01C 21/00; A01C 17/008; A01C 7/20; A01C 7/00–7/208; A01D 41/1277; A01D 41/1272; A01D 43/14; A01D 41/127; A01D 41/1273; A01D 41/1271; A01D 41/1278; G05D 1/00–1/12
USPC .......................................................... 701/50
See application file for complete search history.

(56) References Cited

U.S. PATENT DOCUMENTS

| | | | | |
|---|---|---|---|---|
| 2002/0173893 A1* | 11/2002 | Blackmore | .......... | A01D 41/127 701/50 |
| 2010/0205922 A1* | 8/2010 | Pierson | .................. | A01D 43/14 56/14.3 |
| 2011/0270495 A1* | 11/2011 | Knapp | ............... | A01D 41/1243 701/50 |
| 2012/0016517 A1* | 1/2012 | Holland | ............... | A01C 21/002 700/225 |
| 2012/0101634 A1* | 4/2012 | Lindores | .............. | A01B 79/005 700/266 |
| 2012/0245802 A1* | 9/2012 | Schlesser | ........... | A01D 41/1243 701/50 |
| 2013/0000535 A1* | 1/2013 | Martin | ................... | A01B 39/08 111/149 |

(Continued)

FOREIGN PATENT DOCUMENTS

| DE | 4223585 A1 | 1/1994 |
|---|---|---|
| DE | 4322293 A1 | 1/1995 |

(Continued)

OTHER PUBLICATIONS

European Search Report issued in counterpart European Patent Application No. 19180915.1 dated Feb. 14, 2020 (5 pages).

*Primary Examiner* — Angelina Shudy
*Assistant Examiner* — Mohamed Abdo Algehaim
(74) *Attorney, Agent, or Firm* — Taft Stetinius & Hollister LLP; Stephen F. Rost (57) ABSTRACT

A work machine with a sensing assembly that identifies characteristics of an underlying surface and a distribution assembly that distributes material to the underlying surface. Wherein, the sensing assembly identifies the characteristics of the underlying surface and the distribution assembly distributes varying amounts of material based on the characteristics as the work machine moves along the underlying surface.

16 Claims, 4 Drawing Sheets

(56) References Cited

U.S. PATENT DOCUMENTS

| | | | |
|---|---|---|---|
| 2013/0197767 A1* | 8/2013 | Lenz | A01B 79/00 |
| | | | 701/50 |
| 2014/0230391 A1* | 8/2014 | Hendrickson | A01D 41/1271 |
| | | | 56/10.2 R |
| 2014/0277959 A1* | 9/2014 | Wagers | A01C 21/005 |
| | | | 701/50 |
| 2014/0335923 A1* | 11/2014 | Biggerstaff | A01D 41/127 |
| | | | 460/75 |
| 2015/0156971 A1* | 6/2015 | May | A01D 75/282 |
| | | | 460/1 |
| 2015/0216104 A1* | 8/2015 | Bassett | A01B 29/04 |
| | | | 172/151 |
| 2015/0293029 A1* | 10/2015 | Acheson | G01N 21/84 |
| | | | 356/51 |
| 2016/0037713 A1* | 2/2016 | Wendte | A01C 21/005 |
| | | | 111/177 |
| 2016/0084813 A1* | 3/2016 | Anderson | A01D 41/1271 |
| | | | 702/5 |
| 2016/0180473 A1* | 6/2016 | Groeneveld | A01C 21/00 |
| | | | 705/7.25 |
| 2016/0212831 A1 | 7/2016 | Henry | |
| 2016/0212931 A1* | 7/2016 | Henry | A01D 43/14 |
| 2017/0016870 A1* | 1/2017 | McPeek | G01N 33/025 |
| 2017/0142900 A1* | 5/2017 | Mahieu | A01C 17/008 |
| 2017/0160916 A1* | 6/2017 | Baumgarten | G06F 3/04847 |
| 2017/0188515 A1* | 7/2017 | Baumgarten | A23L 33/105 |
| 2017/0215330 A1* | 8/2017 | Missotten | G05D 1/0219 |
| 2018/0014452 A1* | 1/2018 | Starr | A01C 21/007 |
| 2018/0053067 A1* | 2/2018 | Walker | A23L 33/105 |
| 2018/0128933 A1* | 5/2018 | Koch | A01C 7/105 |
| 2018/0168094 A1* | 6/2018 | Koch | G01N 33/24 |
| 2019/0150357 A1* | 5/2019 | Wu | A01C 21/00 |
| 2019/0289786 A1* | 9/2019 | Prystupa | G01N 33/025 |
| 2019/0350124 A1* | 11/2019 | Pitt | A01C 7/206 |
| 2020/0221632 A1* | 7/2020 | Strnad | A01C 7/205 |
| 2021/0015407 A1* | 1/2021 | Bohm | C09D 135/02 |
| 2021/0127573 A1* | 5/2021 | Mahieu | G01S 13/88 |

FOREIGN PATENT DOCUMENTS

| | | |
|---|---|---|
| DE | 4325469 A1 | 2/1995 |
| DE | 19648223 A1 | 5/1998 |
| DE | 102013208680 A1 | 11/2014 |
| EP | 1346624 A1 | 9/2003 |
| EP | 2570968 A2 | 3/2013 |
| EP | 3171241 A1 | 5/2017 |

* cited by examiner

PRESCRIPTION COVER CROP SEEDING WITH COMBINE

FIELD OF THE DISCLOSURE

The present disclosure relates to a harvesting machine, and in particular, to a harvesting machine that monitors the harvested crop and distributes a material on the underlying surface during a harvest operation.

BACKGROUND

Many different surface preparation methods and products are used in many different farming and the like industries. For example, fertilizers are frequently deposited on the underlying surface to supply one or more plant nutrients for subsequently planted or currently growing crops. Fertilizer is often distributed in equal amounts throughout the underlying surface of the field being worked. Alternatively, more sophisticated systems may apply fertilizer to the fields utilizing a pre-determined fertilizer prescription. In this example, the underlying surface is analyzed and tested prior to applying the fertilizer to the field and the fertilizer prescription is developed based on the prior field testing. The fertilizer may then be applied to the field in different amounts based on the needs identified by the fertilizer prescription.

Similarly, many farmers implement cover crops to manage soil erosion, reduce weed growth, and increase soil quality for the primary crop. Many different types of cover crops are utilized on a field based on the needs of the farmer. The cover crops are typically distributed consistently throughout the field and allowed to grow after a harvest operation has been performed to harvest the primary crop.

Developing a prescription for applying a surface preparation to a field often requires data obtained from prior harvesting operations or from prior field testing. In this configuration, the field must be traversed multiple times by a tractor or other work machine to obtain data to develop a prescription. Then, the tractor or other work machine applies the material to the underlying surface that corresponds with the prescription. This approach costs the user time and fuel to generate a prescription and apply the prescription by depositing the corresponding material on the underlying surface.

SUMMARY

One embodiment of the present disclosure is a work machine with a sensing assembly that identifies characteristics of an underlying surface and a distribution assembly that distributes material to the underlying surface. Wherein, the sensing assembly identifies the characteristics of the underlying surface and the distribution assembly distributes varying amounts of material based on the characteristics as the work machine moves along the underlying surface.

One example of this embodiment includes a harvesting assembly that executes a harvesting operation, wherein the harvesting operation is executed at substantially the same time as the distribution assembly distributes material on the underlying surface. In one aspect of this example, the sensing assembly identifies the characteristics at substantially the same time as the harvesting operation. In another aspect of this example, the sensing assembly includes a mass flow sensor that identifies a current yield amount during the harvesting operation, wherein the distribution assembly distributes material at a distribution rate based on the current yield amount. As part of this aspect, when the current yield amount is a first value, the distribution rate is a first rate and when the current yield is a second value, the distribution rate is a second rate, the first rate being different from the second rate.

In another example, the distribution assembly is a planter and the material is a cover crop seed, wherein the distribution assembly varies the density of cover crop seed distributed on the underlying surface based on the characteristics identified by the sensing assembly.

In another example of this embodiment, the distribution assembly comprises a plurality of cover crop varieties and the material distributed by the distribution assembly is at least one of the cover crop varieties.

In yet another example of this embodiment, the characteristics of the underlying surface are saved in a memory unit.

In another example, the characteristics of the underlying surface may be any of a crop yield, grain moisture, grade, or nitrogen level.

Another embodiment of this disclosure is a system for planting a cover crop during a harvesting operation. The system has a harvesting assembly that harvests crops from an underlying surface, a sensing assembly that monitors harvested crop, and a cover crop distribution assembly that selectively distributes cover crop seed on the underlying surface. Wherein the cover crop distribution assembly modifies cover crop seed distribution during the harvesting operation based on feedback from the sensing assembly.

In one example of this embodiment, the sensing assembly comprises a mass flow sensor that identifies a current yield value during the harvesting operation. In one aspect of this example, when the current yield value decreases, the cover crop distribution assembly increases the cover crop seed applied to the underlying surface.

In another example of this embodiment, the cover crop distribution assembly comprises a first cover crop seed variety and a second cover crop seed variety, wherein the cover crop distribution assembly selects which of the first cover crop seed variety or the second cover crop seed variety to apply to the underlying surface based on the feedback from the sensing assembly.

In another example of this embodiment, the cover crop distribution assembly has more than one variety of cover crop and the distribution assembly selects one of the cover crop varieties to apply to the underlying surface based on inputs from the sensing assembly.

In yet another example of this embodiment, the cover crop distribution assembly records cover crop distribution data during the harvesting operation, wherein the cover crop distribution data identifies the amount of cover crop seed distributed on the underlying surface during the harvesting operation. In one aspect of this example, the cover crop distribution data includes a geographic location indicator. In another aspect of this example, the cover crop distribution data is a cover crop prescription.

Yet another embodiment of the present disclosure is a method for actively managing and distributing a cover crop during a harvesting operation of a work machine. The method includes providing a harvesting assembly, a sensing assembly, a cover crop distribution assembly, and a controller; harvesting crop with the harvesting assembly as the work machine travels along an underlying surface; monitoring the harvested crop, with the controller communicating with the sensing assembly, to determine crop characteristics; and manipulating the cover crop distribution assembly, with the controller, to distribute cover crop seed on the underlying surface at a density that corresponds with the determined crop characteristics. Wherein, the controller determines the crop characteristics throughout the harvesting operation and actively adjusts the density responsive to a change in crop characteristics.

In one example of this embodiment, the crop characteristics monitored by the controller through the sensing assembly are any of a yield or a grain quality.

In yet another example of this embodiment, the crop distribution assembly has a plurality of cover crop varieties, wherein the controller selects an ideal cover crop variety from the plurality of cover crop varieties based on the crop characteristics before the manipulating the cover crop distribution assembly step.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
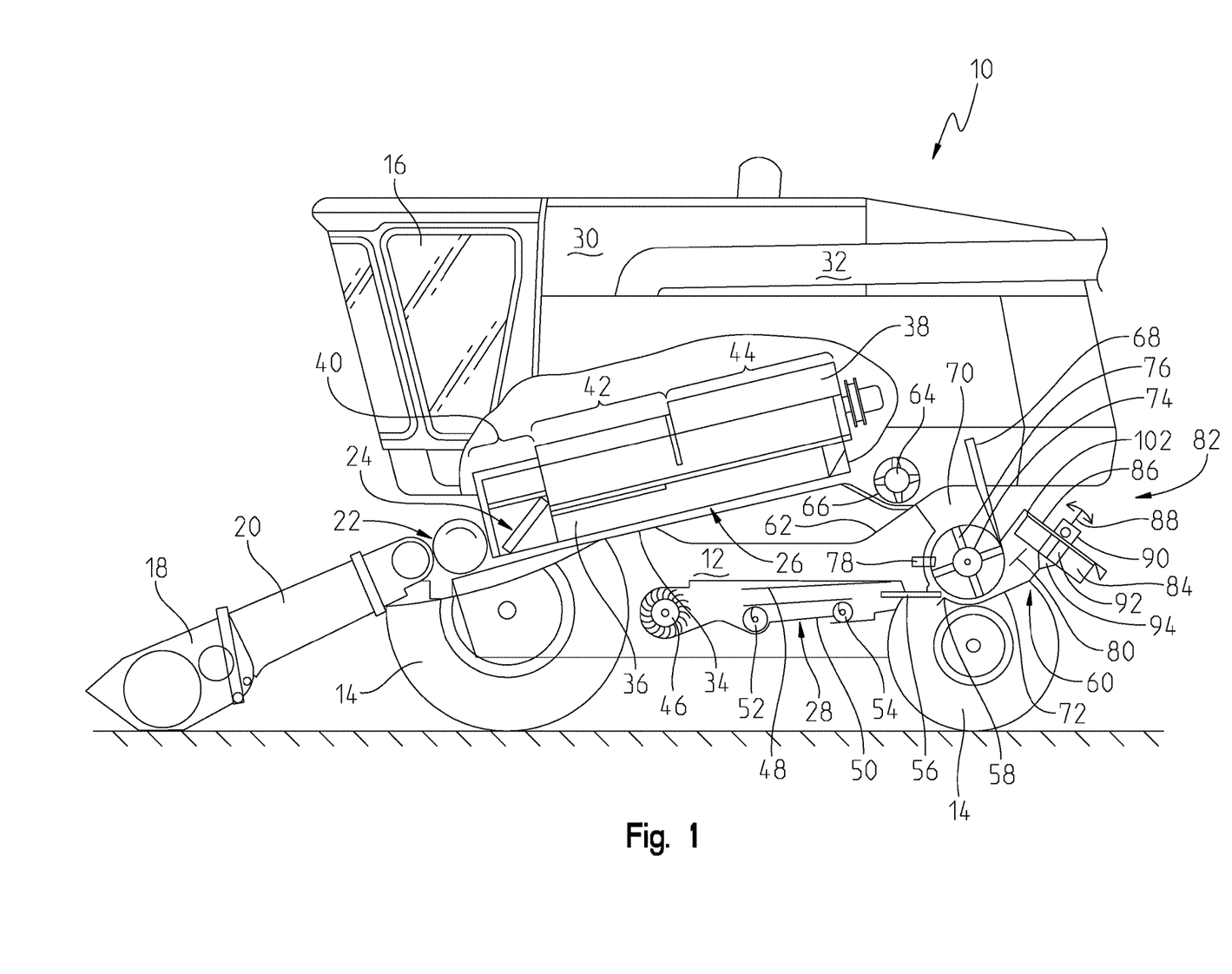
FIG. 1 is a partial section of a side view of a combine.

In FIG. 1, an embodiment of an agricultural combine 10 is shown with a chassis 12 with wheels 14 in contact with the underlying surface. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing arrangement 26. In place of the axial harvested crop processing arrangement 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. In a typical combine 10, the sieves 48, 50 can be oscillated in a fore-and-aft direction.

The cleaning system 28 removes the chaff and guides the clean corn or other clean crop over a screw conveyor 52 to a paddle elevator for clean corn or clean crop. The elevator for clean crop deposits the clean crop in a clean crop tank 30, as shown in FIG. 1. The clean crop in the crop tank 30 can be unloaded by means of an unloading screw conveyor 32 to a crop wagon, trailer, or truck. Harvested crop remaining at the lower end of the lower sieve 50 is again transported to the harvested crop processing arrangement 26 by a screw conveyor 54 and an overhead conveyor. The harvested crop residue delivered at the upper end of the upper sieve 48 that consist essentially of chaff and small straw particles or other debris may be conveyed by means of an oscillating sheet conveyor 56 to the rear and to a lower inlet 58 of a chopper rotor assembly 60.

The aforementioned blower 46 produces an air flow that carries much of the chaff and other debris to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In one aspect of this disclosure, a mass flow sensor may be positioned in the combine 10 to facilitate identification of the yield of the combine 10 during a harvesting operation. In one non-exclusive example, the mass flow sensor comprises an impact plate having an arm which is axially aligned with the predominant grain flow from the paddle elevator. The arm is coupled to a force measuring assembly having a potentiometer or the like for generating an electric signal that is proportional to impact force. In turn, the controller may utilize the impact force to determine the current yield being produced during the harvesting operation.

While a particular method and location of a mass flow sensor is discussed herein, any form and location of mass flow sensor could be used in association with the teachings of this disclosure. A person skilled in the relevant art understands the different ways a mass flow sensor can be implemented on a combine to determine active yield during a harvesting operation. Accordingly, this disclosure considers implementing any type of mass flow sensor applied in any location of the combine 10 as is known in the art.

In another aspect of this disclosure, the combine 10 may have a moisture sensor mounted to the elevator. The moisture sensor may have a chamber having an inlet for receiving clean grain from the paddle elevator and an outlet for inserting grain back through the outlet formed in the wall of the paddle elevator. The chamber may have a grain moisture analyzer having means for bypassing a portion of the clean grain in the elevator through the chamber. A flow control means or feed means comprising a paddle wheel is located just upstream from the outlet. The paddle wheel has four flexible rubber paddles that extend across the chamber between the sidewalls for controlling the flow of grain out of the chamber. The paddle wheel is rotated by an electric motor that is provided with suitable gearing for slowing its output. The paddle wheel controls the flow of grain through the chamber so that there is an adequate sample of grain to sense grain moisture.

The chamber of the moisture sensor is also provided with a capacitance sensing means such as a sensing cell that has a first, second, and third metal plates. The first two metal plates are adjacent and parallel to the walls of the chamber. The first and second plates are electrically coupled to one another by jumpers. The first and second plates, and the jumpers may be formed from a single piece of sheet metal that is bent in a U-shape. The third plate is parallel to the first two plates and positioned between them. All the plates are coupled to an electrical controller. Clean grain flowing between the plates forms a dielectric material which varies the capacitance of the system as moisture content varies in the grain. The electronic controller monitors the change in capacitance and relates this to grain moisture by utilizing various capacitance/grain moisture calibration curves that can be derived experimentally for various grains.

While one particular type of grain moisture sensor is described herein, a person skilled in the relevant art understands any type of grain moisture sensor known in the art could be utilized to implement the teachings of this disclosure. Accordingly, this disclosure contemplates using any grain moisture sensor known by a person having relevant skill in the art for which this disclosure pertains.

In another aspect of this disclosure, the grain quality being produced during a harvesting operation may be monitored utilizing some or all of the techniques described in U.S. Pat. No. 9,779,330 issued to Deere and Company, the detailed description of which is incorporated herein by reference. More specifically, the combine 10 may implement a grain quality visual monitoring system. The visual monitoring system may estimate or determine the quality of bulk grain being processed by the combine 10. The visual monitoring system may have a bulk grain image source, such as a camera, coupled to a controller and a display among other things. The bulk grain image source may have one or more devices configured to capture at least one image of bulk grain for analysis by the visual system in determining quality of the grain.

In one implementation of the visual monitoring system, "bulk grain" refers to a mass of harvested product which when clean includes only grain of the particular intended crop being harvested (or "clean crop"), but which, when not clean, additionally includes some of broken grain, skinned grain, unthreshed grain of the intended crop, grain of unintended plants such as weeds or volunteer plants, and/or other non-grain elements such as chaff, hulls, sticks, stock, cobs, stems, pods, dirt or other foreign contaminants and debris. In one implementation, a camera, such as an optical camera or an infrared camera, captures at least one image of bulk grain. The camera may be mounted on any portion of the combine 10 that allows the camera to take a picture of the bulk grain. Further, multiple cameras may be implemented to monitor the grain quality in different portions of the combine 10.

The visual monitoring system may implement the camera or cameras to analyze the quality of the bulk grain being processed. The visual monitoring system may include a quality determination analysis that identifies the quality of the bulk grain visualized by the camera or cameras. In this non-exclusive example, the quality determination analysis may identify the percentage of clean crop, broken grain, and MOG present in the bulk grain to name a few. However, the visual monitoring system may be utilized to monitor any characteristic of the bulk grain that can be assessed by the cameras and this disclosure considers monitoring other characteristics of the bulk grain as well.

Figure 2:
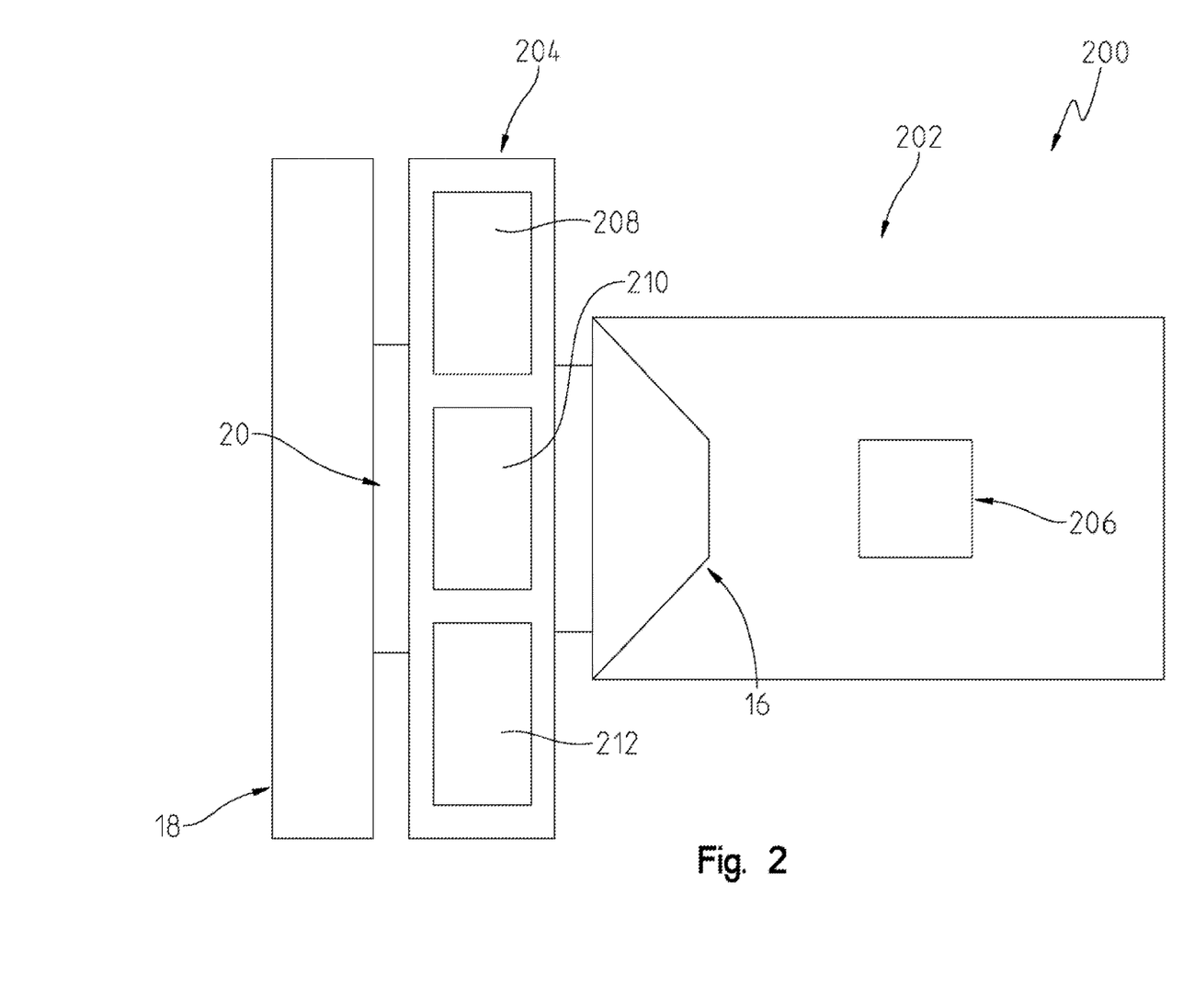
FIG. 2 is a schematic view of a combine with a distribution assembly.

Referring now to FIG. 2, another embodiment of the present disclosure is illustrated. More specifically, FIG. 2 illustrates a schematic representation 200 of a harvesting assembly 202 with a distribution assembly 204 coupled thereto. The harvesting assembly 202 may be substantially the same as the combine 10 described above with reference to FIG. 1. However, the harvesting assembly 202 may differ from the combine 10 because it has a distribution assembly 204 coupled thereto. The harvesting assembly 202 may contain all of the components of the combine 10 and be capable of performing all of the functions described above for the combine 10.

In one aspect of this disclosure, the harvesting assembly 202 may also have a sensing assembly 206. The sensing assembly 206 may utilize any of the sensors described above to monitor harvested crop. More specifically, the sensing assembly 206 may have any one or more of a mass flow sensor, a moisture sensor, a grain quality sensor, or the like on the harvesting assembly 202 to monitor the crop being harvested. The sensing assembly 206 may include any type of sensor known in the art to identify the quality of the harvested crop or the underlying surface.

The harvesting assembly 202 may be capable of performing a harvesting operation. In a harvesting operation, the cutter head 18 may sever underlying crop and direct the severed crop through the slope conveyer 20 as described above for the combine 10. Further, as part of the harvesting operation the harvesting assembly 202 may implement the components described above for the combine 10 to clean and separate the harvested crop into clean crop (typically a grain) and crop debris (such as chaff). As is known in the art and described in part above, the clean crop is typically stored in the clean crop tank 30 until it is removed from the harvesting assembly 202 onto a separate transport vehicle. The chaff is typically discharged from the combine 10, or the harvesting assembly 202, via the outlet 80.

In addition to all of the components described above for the combine 10, the harvesting assembly 202 may also have the distribution assembly 204 coupled thereto. In the embodiment shown in FIG. 2, the distribution assembly 204 is illustrated coupled to the harvesting assembly 202 between the cutter head 18 and the operator's cab 16. In one non-exclusive example, the distribution assembly 204 may be coupled to the harvesting assembly 202 underneath the slope conveyer 20. However, this disclosure contemplates mounting the distribution assembly anywhere on the harvesting assembly 202, and the particular locations discussed herein are not exhaustive. More specifically, in another embodiment of this disclosure the distribution assembly 204 may be coupled to the harvesting assembly 202 on a back side that is the opposite side of the harvesting assembly 202 from the cutter head 18. Further still, in other embodiments the distribution assembly 204 may be towed behind the harvesting assembly 204 via a drawbar or other hitched engagement to the harvesting assembly 202.

The distribution assembly 204 may be a fertilizing assembly, a planting assembly, or any other assembly that deposits a material on the underlying surface. More specifically, if the distribution assembly 204 is a fertilizing assembly it may be configured as a liquid or dry product application. In some non-exclusive examples, the fertilizing assembly may be an anhydrous ammonia (NH3) applicator, a sprayer, a dry box spreader, or a strip till applicator. Further, the distribution assembly 204 may implement a rate controller to vary the distribution rate of the fertilizer being distributed therefrom. One non-exclusive example is a product made by Deere & Company called the "Rate Controller 2000", however, this disclosure may be implemented using any controller capable of altering fertilizer distribution rates.

In an alternative embodiment, the distribution assembly 204 may be a planting assembly that can selectively plant or otherwise distribute a seed on or in the underlying surface. In one aspect of this embodiment, the planting assembly may be configured to distribute a cover crop on the underlying surface. As is known in the art, the seed density, or the rate in which the seed is distributed on the underlying surface, may be altered by a controller.

Further still, the distribution assembly 204 may implement, in part, the teachings of U.S. Pat. No. 8,948,980 assigned to Deere & Company, the detailed description of which being incorporated herein by reference. In this embodiment the distribution assembly 204 may be a seeding machine, such as a row crop planter, which is adapted to switch between two or more seed varieties as the machine traverses a field. The distribution assembly 204 may be capable of distributing at least a first variety 208 and a second variety 210 therefrom. In the case of a planter, the varieties 208, 210 may contain material such as different types of cover crop seed. However, other embodiments may include material in the different varieties 208, 210 such as different types of fertilizers or ground coverings as well.

More specifically, distribution assembly 204 or harvesting assembly 202 may utilize a controller for controlling the function of the distribution assembly 204 as described in the '980 patent. For example, the controller may control the operation of actuators that rotate gates to determine which seed variety flows into a meter housing. Further, the controller may also control the rotation speed of seed disks to determine and vary the seed application rate, that is, the number of seeds per unit of area, e.g. seeds per acre.

Accordingly, the distribution assembly 204 may be any type of variable rate or variety applicator known in the art. In other words, the distribution assembly 204 may be capable of distributing different types and quantities of material on or in the underlying surface. The materials being applied by the distribution assembly 204 contemplated herein may be any of seed, fertilizer, or any other material applied to a field.

Figure 3:
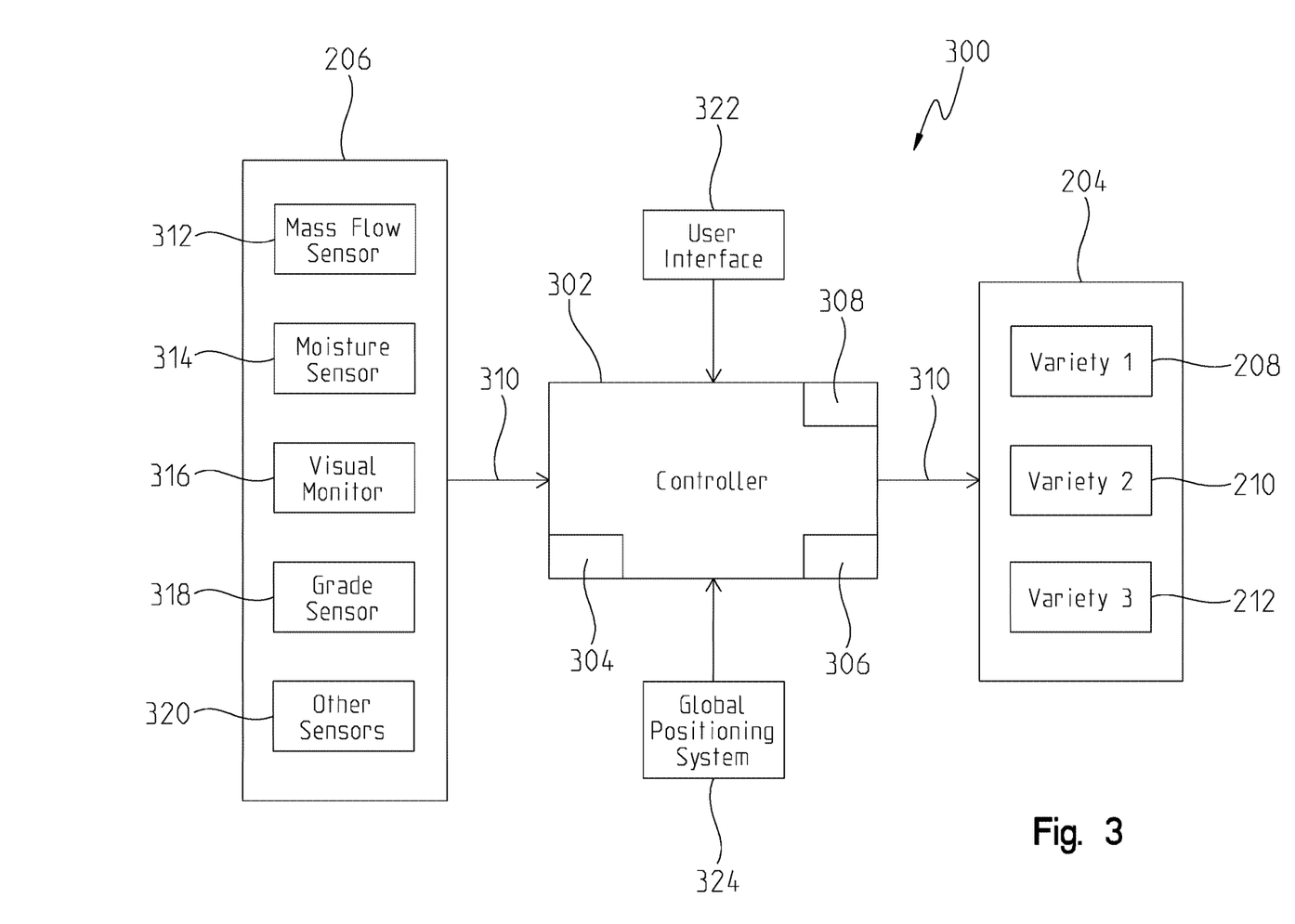
FIG. 3 is a schematic view of a control system for the combine and distribution assembly of FIG. 2.

Referring now to FIG. 3, a schematic representation of control system 300 is shown. The control system 300 of FIG. 3 illustrates a controller 302 in communication with the sensing assembly 206 and the distribution assembly 204. The controller 302 may have a memory unit and may take any form known in the art at the time of this disclosure, and is not limited to any particular form or location. Rather, the controller 302 can be anything capable of storing and processing data and executing commands. While controller 302 is used herein in a singular form, multiple controllers are also considered for executing the logic described. More specifically, in one non-exclusive example the controller 302 may include a combine controller 304, a distribution assembly controller 306, and a remote controller 308 to name a few non-exclusive examples.

The control system 300 may also have a user interface 322 and a Global Positioning System (GPS) 324 in communication with the controller 302. The user interface 322 may be a touch screen, buttons, microphone, camera, or any other sensor capable of receiving a command from a user. In one non-exclusive example, the user interface provides a way for the user to input parameters for the control system 300.

The GPS 324 may provide geographical data to the controller 302 that can be stored and monitored therein. In one non-exclusive example of the GPS 324, the controller 302 may store data obtained from the sensing assembly 206 along with a corresponding GPS reading from the GPS 324. In this configuration, the controller 302 may save data in a memory unit or the like regarding field characteristics along with the specific geographic location of the data region obtained from the GPS 324.

The combine controller 304 may be any controllers that control systems of the harvesting assembly 202. As one example, the combine controller 304 may be a controller on the harvesting assembly 202 in communication with the sensing assembly 206. However, other controllers are considered herein as well and any controller of the harvesting assembly 202 could implement the teachings of this disclosure.

Similarly, the distribution assembly controller 306 may be a controller that is particularly designed to control the distribution assembly 204. If the distribution assembly controller 306 is a controller dedicated to the distribution assembly 204, it may communicate with any other systems of the controller 302 to execute the logic described herein.

The controller 302 may also be wholly or partially located remotely from the harvesting assembly 202. More specifically, the remote controller 308 may not be a controller that is physically located on the harvesting assembly 202 but rather a controller located remotely therefrom. In this embodiment, the remote controller 308 may be located on a wireless device that communicates with the harvesting assembly 202 to execute the logic described herein. The remote controller 308 may utilize any known wireless signal to communicate with the harvesting assembly 202. More specifically, the remote controller 308 may utilize cellular signals, radio signals, satellite communications, Bluetooth, or any other known wireless protocol to control components of the harvesting assembly 202 as described herein.

Regardless of the form, the controller 302 may be in communication with the sensing assembly 206 and the distribution assembly 204 via one or more communication protocol 310. The communication protocol 310 may be wired or wireless communication between the controller 302 and the sensing assembly 206 and the distribution assembly 204. In one non-exclusive example, the communication protocol 310 may be electrical signals sent via a wire harness to the controller 302 such as a CAN bus. Alternatively, the communication protocol 310 may utilize known wireless technology to wirelessly communicate between the controller 302 and the distribution assembly 204 and the sensing assembly 206. Accordingly, this disclosure considers any known form of communication between the sensing assembly 206 and the controller 302 and the distribution assembly 204 and the controller 302.

The sensing assembly 206 may include one or more of the sensors described above for the harvesting assembly 202. More specifically, the sensing assembly 206 may include a mass flow sensor 312 that communicates with the controller 302 to identify the current yield of the harvesting assembly 202. Similarly, the sensing assembly 206 may be in communication with a moisture sensor 314 as described above. The controller 302 may utilize the communications with one or more of the mass flow sensor 312 and the moisture sensor 314 to identify the current yield of the harvesting assembly 202 during the harvesting operation as is known in the art.

The controller 302 may also communicate with a visual monitor 316 to identify characteristics of the harvested crop as described above for the visual monitoring system. The visual monitors 316 may communicated with the controller to identify the quality of the harvested crop. For example, the visual monitor 316 may identify the amount of MOG in the harvested crop or the amount of broken grains therein to give a couple non-exclusive examples.

In another embodiment of the present disclosure, the sensing assembly 206 may include a grade sensor 318 that identifies the orientation of the harvesting assembly 202 as it travels along the underlying surface. In one non-exclusive application of this disclosure, the controller 302 may communicate with the grade sensor 318 to identify the current grade of the harvesting assembly 206. In this non-exclusive example, the harvesting assembly 202 may distribute material such as cover crop seed from the distribution assembly 204 when the grade is greater than a grade threshold. In this example, the cover crop may be applied when the grade is greater than a grade threshold to resist erosion in steep grade areas of the underlying surface.

The sensing assembly 206 may also communicate with any other sensors 320 of the harvesting assembly 202. The other sensors 320 may be any sensors used on the harvesting assembly 202. More specifically, the other sensors 320 may be sensors that identify the amount of material in the distribution assembly. In another non-exclusive example, the other sensors 320 may be configured to identify the amount of nitrogen in the underlying surface. Accordingly, this disclosure contemplates monitoring any sensors that are known to be utilized on a planter or harvesting assembly 202.

The controller 302 may also instruct the distribution assembly 204 on how much and what material to distribute on the underlying surface during a harvesting operation. For example, the distribution assembly 204 may include many different varieties of material 208, 210, 212 that can be selectively distributed on the underlying surface during the harvesting operation. The controller 302 may select which variety or combination of varieties 208, 210, 212 to distribute onto or in the underlying surface during the harvesting operation based on inputs from the sensing assembly 206. The varieties 208, 210, 212 may be different types of cover crop seed, fertilizer, or any other surface material used to facilitate growth of a primary crop.

The cover crop seed in the varieties 208, 210, 212 can be any type of cover crop seed known in the art and implemented to address different characteristics of the underlying surface. In one non-exclusive example, the first variety 208 may be a legume seed that is distributed on the underlying surface when the controller 302 identifies a low nitrogen condition of the underlying surface with the other sensors 320.

Further, a second variety 210 of the distribution assembly 204 may be a grass such as rye, wheat, barley, or oats to name a few non-exclusive examples. The grass seed in the second variety 210 may be implemented by the distribution assembly 204 to scavenge nutrients or to reduce erosion among other things. In one non-exclusive example, if the grade sensor 318 identifies a grade greater than a preset grade threshold during the harvesting operation, the distribution assembly 204 may distribute a grass seed from the second variety 210 to reduce erosion of the underlying surface.

A third variety 212 of the distribution assembly 204 may be any other cover crop seed that is used in the art. In one non-exclusive example, the third variety 212 may contain a buckwheat or *brassica* seed. The third variety 212 may be distributed on the underlying surface to suppress weeds, combat root pathogens, increase subsequent plant root penetration or the like. The controller 302 may utilize the visual monitor 316 to identify when the third variety 212 should be distributed based on the visual characteristics of the harvested crop.

In another embodiment, the distribution assembly 204 may have different varieties 208, 210, 212 of fertilizer therein. More specifically, the first variety 208 may be a nitrogen based fertilizer, the second variety 210 may be a phosphorous based fertilizer, and the third variety 212 may be a potassium based fertilizer as one non-exclusive example. In this example, the controller 302 may select which variety or combination of varieties 208, 210, 212 to distribute on the underlying surface based on the characteristics identified by the sensing assembly 206. More specifically, if the sensing assembly 206 identifies a nitrogen deficiency during the harvesting operation, the first variety 208 of the distribution assembly 204 may be deposited on the underlying surface. Alternatively, if the sensing assembly 206 identifies a phosphorous deficiency during the harvesting operation, the second variety 210 of the distribution assembly 204 may be deposited on the underlying surface. Further still, if the sensing assembly 206 identifies a nitrogen and potassium deficiency during the harvesting operation, the first variety 208 and the third variety 212 of the distribution assembly 204 may be deposited on the underlying surface.

While three varieties 208, 210, 212 of the distribution assembly 204 are described herein, this disclosure is not limited to three varieties. Rather, any number of varieties could be used. One example of this disclosure has less than three varieties of material in the distribution assembly 204, while another example of this disclosure has more than three varieties of material in the distribution assembly 204. Further still, while the distribution assembly 204 is described herein as having either cover crop seed or fertilizer, one embodiment of the distribution assembly 204 contains both cover crop and fertilizer simultaneously. In this embodiment, the sensing assembly 206 may identify characteristics of the underlying surface that are addressed by the distribution assembly 204 be depositing both a cover crop seed and a fertilizer thereon simultaneously. Accordingly, this disclosure considers embodiments using any combination of material distributed from the distribution assembly 204.

Figure 4:
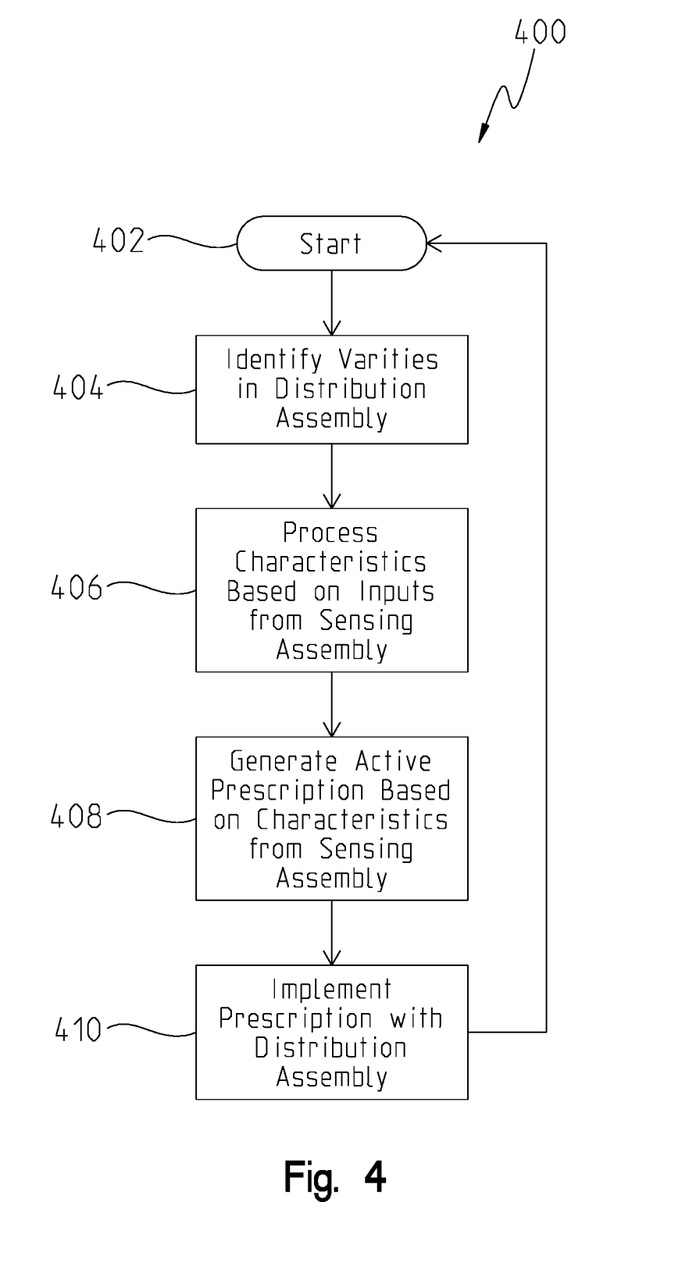
FIG. 4 is one embodiment of a control logic for the control system of FIG. 3.

Referring now to FIG. 4, one non-exclusive example of a control logic 400 is illustrated. The control logic 400 may be implemented by the controller 302 or any other controller capable of executing the logic described herein. The control logic 400 may be implemented after a start command is initiated in box 402. The start command 402 may be any signal received by the controller 302 that indicates the user is initiating a harvesting operation. For example, the start command 402 may be a signal indicating the cutter head 18 has been lowered and engaged. Alternatively, the start command 402 may be a user input from the user interface 122. The user input may allow the user to indicate to the controller 302 to initiate the control logic 400. Accordingly, the start command 402 may be any signal from the harvesting assembly 202 that indicates a harvesting operation has begun.

In one aspect of the control logic 400, the varieties 208, 210, 212 or types of materials are identified and stored as part of the control logic 400 in box 404. In box 404, the specific type of material may be identified as cover crop seed, fertilizer, or any other material. Further, the control logic 400 may also associate the materials in the distribution assembly 204 with characteristics of the underlying soil that the particular material may address. More specifically, the user may utilize the user interface to set the material in the first variety 208 to be a nitrogen fertilizer and the material in the second variety 210 to be a grass seed. Then, the user may utilize the user interface 322 to have the material of the first variety 208 applied when the sensing assembly 206 is showing the characteristics of the crop to be indicating a low nitrogen condition. Further, the user may input into the user interface 322 to have the distribution assembly 204 apply the material of the second variety 210 when the grade sensor 318 indicates the harvesting assembly 202 is on a grade greater than a grade threshold.

While box 404 is described above as a user input through the user interface 322, this disclosure also considers embodiments wherein box 404 is implemented automatically without interactions with the user interface 322. More specifically, the type of material being applied by the varieties 208, 210, 212 may be automatically identified by the controller 302 through a scanner or other sensor. In this embodiment, the controller 302 may automatically associate the material type with the characteristics of the underlying surface with which they should be applied. For example, if the controller 302 identifies one of the varieties 208, 210, 212 as potassium, the controller 302 may automatically correlate that variety to be applied when the sensing assembly 206 identify characteristics of the crop that indicate a potassium deficiency. Accordingly, the material and application of the material in the varieties 208, 210, 212 of the distribution assembly 204 may be automatically identified and implemented as part of the control logic 400.

Referring now to box 406, the controller 302 may utilize the sensing assembly 206 to identify the characteristics of the crop being harvested during the harvest operation or the underlying surface. The characteristics may include identifying the nutrient levels of the harvested crops or underlying surface along with the yield, grain quality, and MOG being processed to name a few. In one non-exclusive example of box 406, the mass flow sensor 312 and the moisture sensor 314 may be monitored by the controller 302 to identify the current yield being produced by the harvesting operation. In this example, if the current yield is less than a yield threshold, the controller 302 may distribute a nitrogen enriching material on the underlying surface with the distribution assembly 204.

In another example of the input characteristic analyzed in box 406, the visual monitor 316 may be used to monitor the MOG. If the controller 302 identifies weed value with the visual monitor that is greater than a weed value threshold, the controller 302 may distribute a material from the distribution assembly 204 that reduces the likelihood of weed growth. In one non-exclusive example this material may be a cover crop seed or a chemical weed killer.

Further still, another characteristic identified in box 406 may be the grade of the harvesting assembly 202 as determined by the grade sensor 318. One non-exclusive example of this embodiment includes distributing a material with the distribution assembly 204 when the grade determined by the grade sensor 318 is greater than a grade threshold. In this example, the material may be cover crop seed that will reduce erosion.

Finally, the other sensors 320 may be utilized to identify any other desirably characteristics during the harvesting operation. For example, the other sensors 320 may include sensors that actively monitor and analyze the properties of soil from the underlying surface during the harvesting operation.

While several examples of the inputs being processed in box 406 are described herein, this disclosure contemplates utilizing any sensors known in the related art to identify characteristics of the harvested crop or underlying surface that may be used to develop an active prescription during the harvesting operation. In other words, any characteristic that is observable by the controller 302 may be used to identify which variety, or the quantity of material, that should be distributed by the distribution assembly.

Referring now to box 408, the controller 302 may generate an active prescription based on the inputs from the sensing assembly 206. In box 408, the controller 302 may actively identify the characteristics processed in box 406 and determine which material of the varieties 208, 210, 212 and how much of the material should be deposited on or into the underlying surface. In other words, in box 408 the controller 302 may be actively generating a prescription during the harvesting operation that will be immediately implemented by the distribution assembly 204. The prescription generated in box 408 may include amount and type of cover crop seed, fertilizer, weed killer, or any other field preparation material that should be distributed by the distribution assembly 204.

In one aspect of box 408, the controller 302 may also communicate with the GPS 324 to determine the geographic locations associated with the characteristics identified by the sensing assembly 206. In this aspect of the disclosure, the both the geographic location and the characteristics of the underlying surface may be stored by the controller 302 to be later reviewed or otherwise accessed.

In box 410, the controller 302 may utilize the distribution assembly 204 to implement the variety and quantity identified by the prescription from box 408. Accordingly, in box 410 the harvesting assembly 202 may substantially implement the prescription from box 408 with the distribution assembly 204 during the harvesting operation.

In another aspect of box 410, the active prescription being implemented by the controller 302 may also be stored therein. More specifically, the amount of material being distributed from the distribution assembly 204 and the location that correlates with the amount of material may be stored in the controller 302 or in a remote storage location as a saved prescription. The saved prescription may later be analyzed or applied to a field.

In one non-exclusive example of an applications of this control logic 400, the harvesting assembly 202 may have a grass cover crop seed in the first variety 208 and a nitrogen fertilizer in the second variety 210 of the distribution assembly 204. The user may utilize the user interface 322 to select the corresponding materials in the distribution assembly 204 or the controller 302 may automatically identify the material type as described above. Then, the controller 302 may automatically associate those materials with corresponding characteristics of the underlying surface or the user may input desired applications of the materials therein. In this example, the controller 302 may automatically determine that the grass cover crop seed of the first variety 208 will be applied when the grade sensor identifies a grade value greater than a grade threshold. Similarly, the controller 302 may automatically determine that the nitrogen fertilizer of the second variety 210 will be applied when the mass flow sensor 312 identifies a yield value less than a yield threshold.

In the above example, when the harvesting assembly 202 is traveling on a substantially flat underlying surface and the harvesting operation is obtaining an expected yield, the controller 302 may not be applying either the nitrogen fertilizer or the grass cover crop with the distribution assembly 204. More specifically, the characteristics of the underlying surface identified by the sensing assembly 206 indicate that the yield is above the yield threshold and the grade is less than the grade threshold and thereby no material should be distributed by the distribution assembly 204.

However, if the sensing assembly 206 starts to identify low yield characteristics during the harvesting operation, the controller 302 may begin to distribute nitrogen fertilizer from the distribution assembly 204. Further, if the sensing assembly 206 also identifies that the harvesting assembly 202 has entered a grade greater than the grade threshold, the controller 302 may apply both the nitrogen fertilizer and the grass cover crop seed with the distribution assembly 204 to address both the low yield and high grade characteristics of the underlying surface. The controller 302 may continue to monitor the sensing assembly 206 and distribute the nitrogen and cover crop seed while the above threshold values are met. However, once any of the threshold values are no longer met (when the grade of the underlying surface levels out for example), the controller 302 may automatically stop providing the material on the underlying surface.

In one aspect of this disclosure, the controller logic 400 can be continually executed throughout the harvesting operation. More specifically, the controller 302 may continually monitor the sensing assembly 206 and direct the distribution assembly 204 responsive thereto during the entire harvesting operation.

In another aspect of this disclosure, the rate at which the distribution assembly 204 distributes a material from one of the varieties 208, 210, 212 may be a function of a value from the sensing assembly 206. In one non-exclusive example of this application, the current yield may directly influence the distribution rate of a cover crop seed from the distribution assembly 204. More specifically, the cover crop seed may be selected to fertilize the underlying surface as needed based on the current yield. In this configuration, when the sensing assembly 206 is indicating a high current yield, the controller 302 may slow the rate at which the distribution assembly 204 is depositing the cover crop seed because the high yield conditions indicate the underlying surface has adequate nutrients. Alternatively, if sensing assembly 206 is indicating a low current yield, the controller 302 may increase the rate at which the distribution assembly 204 is depositing the cover crop seed because the low yield conditions indicate the underlying surface has inadequate nutrients.

The rate each of the varieties 208, 210, 212 are distributed may be independently controlled by the controller 302 based on characteristics identified by the sensing assembly 206. More specifically, look-up charts, algorithms, tables, or the like may be used to correlate the material in the varieties 208, 210, 212 with the characteristics of the underlying surface. Accordingly, this disclosure considers implementing any known rate control method and logic into the control logic 400.

A person skilled in the art understands the many different ways this disclosure can be implemented to automatically address characteristics of a field during a harvesting operation, and the above examples are not meant to be exclusive. Rather, any combination of cover crop seed, fertilizer, weed killer, or the like material could be added to the distribution assembly 204 and automatically distributed on the underlying surface when corresponding characteristics are identified during a harvesting operation. Further, a person having skill in the relevant art understands the many benefits of this disclosure. As one non-exclusive example, allowing a prescription to be designed and implemented as part of the harvesting operation provides at least both time and fuel savings.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A work machine, comprising:
   a sensing assembly that actively identifies characteristics of a harvested crop during a harvesting operation, identifies a weed value during the harvesting operation, and identifies characteristics of an underlying soil during the harvesting operation, the sensing assembly located on the work machine wherein the sensing assembly identifies the characteristics of the harvested crop, the weed value, and of the underlying soil at substantially a same time as the harvesting operation, wherein the characteristics of the underlying soil includes a current grade of the work machine;

a distribution assembly that distributes a material to the underlying soil at substantially the same time as during the harvesting operation; and a harvesting assembly that harvests crops during the harvesting operation, wherein the harvesting operation is executed at substantially the same time as the distribution assembly distributes the material on the underlying soil, wherein the material includes a seed, a fertilizer, and a weed killer;

wherein, the sensing assembly identifies a current yield amount of the harvested crop at substantially the same time as during the harvesting operation;

a controller in communication with the sensing assembly and the distribution assembly, wherein the controller identifies the current grade as being greater than a grade threshold, identifies the weed value as being greater than a weed value threshold, and identifies the current yield amount as being less than a yield threshold; and the distribution assembly distributes the material based on the characteristics of the harvested crop, the weed value, and the characteristics of the underlying soil and at a distribution rate based on the current yield amount as the work machine moves along the underlying soil during the harvesting operation, wherein the material includes the seed, the fertilizer, and the weed killer, wherein the distribution assembly: i) applies the seed if the current grade is greater than the grade threshold; ii) applies the weed killer if the weed value is greater than the weed value threshold; and iii) applies the fertilizer if the current yield amount is less than the yield threshold.

2. The work machine of claim 1, further wherein the distribution assembly is a planter and the seed is a cover crop seed, wherein the distribution assembly varies a density of the cover crop seed distributed on the underlying soil based on the characteristics identified by the sensing assembly.

3. The work machine of claim 1, further wherein the sensing assembly includes a mass flow sensor that identifies the current yield amount during the harvesting operation.

4. The work machine of claim 3, further wherein when the current yield amount is a first value, the distribution rate is a first rate and when the current yield is a second value, the distribution rate is a second rate, the first rate being different from the second rate.

5. The work machine of claim 1, further wherein the distribution assembly distributes the seed which comprises a plurality of cover crop varieties and the seed distributed by the distribution assembly is at least one of the cover crop varieties.

6. The work machine of claim 1, further wherein the characteristics of the underlying soil are saved in a memory unit.

7. The work machine of claim 1, further wherein the characteristics of the underlying soil may be any of a crop yield, and the characteristics of the harvested crop is one of grain moisture or nitrogen level.

8. A system for planting a cover crop seed during a harvesting operation, comprising:

a harvesting assembly that harvests crops from an underlying soil during the harvesting operation;

a sensing assembly, coupled to the harvesting assembly, that monitors a harvested crop yield amount, identifies a weed value during the harvesting operation, and monitors characteristics of the underlying soil at substantially a same time as during the harvesting operation, wherein the characteristics of the underlying soil includes a current grade identified by the sensing assembly;

a cover crop distribution assembly, coupled to the harvesting assembly, that selectively distributes the cover crop seed from a planter on the underlying soil and a weed killer, wherein the cover crop seed and the weed killer is distributed from the cover crop distribution assembly at substantially the same time as during the harvesting operation;

a controller in communication with the sensing assembly and the cover crops distribution assembly, wherein the controller identifies the current grade as being greater than a grade threshold, identifies the weed value as being greater than a weed value threshold, and identifies the harvested crop yield amount as being less than a yield threshold; and wherein the cover crop distribution assembly modifies cover crop seed distribution at substantially the same time as during the harvesting operation based on feedback determined during the harvesting operation and received from the sensing assembly of the monitored harvested crop yield amount and the monitored characteristics of the underlying soil;

wherein the cover crop distribution assembly has a fertilizer and the cover crop distribution assembly distributes the fertilizer and the weed killer on the underlying soil based on inputs from the sensing assembly; and wherein the cover crop distribution assembly comprises a first cover crop seed variety and a second cover crop seed variety, wherein the cover crop distribution assembly selects which of the first cover crop seed variety or the second cover crop seed variety to apply to the underlying soil based on the feedback from the sensing assembly and the cover crop distribution assembly switches between the first cover crop seed variety and the second cover crop seed variety as the system traverses a field during the harvesting operation, and wherein the cover crop distribution assembly: i) applies one of the first cover crop seed variety or the second cover crop seed variety if the current grade is greater than the grade threshold; ii) applies the weed killer if the weed value is greater than the weed value threshold; and iii) applies the fertilizer if the harvested crop yield amount is less than the yield threshold.

9. The system of claim 8, further wherein the sensing assembly comprises a mass flow sensor that identifies the harvested crop yield amount during the harvesting operation.

10. The system of claim 9, further wherein when the harvested crop yield amount decreases, the cover crop distribution assembly increases the cover crop seed applied to the underlying soil.

11. The system of claim 8, further wherein the cover crop distribution assembly records cover crop distribution data during the harvesting operation, wherein the cover crop distribution data identifies an amount of the cover crop seed distributed on the underlying soil during the harvesting operation.

12. The system of claim 11, further wherein the cover crop distribution data includes a geographic location indicator.

13. The system of claim 11, further wherein the cover crop distribution data is a cover crop prescription.

14. A method for actively managing and distributing a cover crop seed during a harvesting operation of a work machine, comprising:

providing a harvesting assembly, a sensing assembly located on the harvesting assembly, a cover crop distribution assembly located on the harvesting assembly, and a controller located on the harvesting assembly, that comprises the work machine;

harvesting crop with the harvesting assembly during the harvesting operation, as the work machine travels along an underlying soil;

monitoring characteristics of the harvested crop, a weed value, and characteristics of the underlying soil, including a current grade of the work machine, with the sensing assembly while the work machine travels along the underlying soil during the harvesting operation, with the controller communicating with the sensing assembly, to determine the characteristics of the harvested crop, the weed value, and characteristics of the current grade of the work machine based on the underlying soil;

identifying with the controller the current grade as being greater than a grade threshold, identifying the weed value as being greater than a weed value threshold, and identifying a harvested crop yield amount as being less than a yield threshold;

manipulating the cover crop distribution assembly, with the controller, to distribute: i) the cover crop seed on the underlying soil, a weed killer, and a fertilizer while the work machine travels along the underlying soil, at a density that corresponds with the characteristics of the harvested crop determined, the weed value, and the characteristics of the underlying soil;

wherein, the controller determines the harvested crop characteristics, the weed value, and the characteristics of the underlying soil, including the current grade of the work machine, throughout the harvesting operation and actively adjusts the density responsive to a change in the characteristics of the harvested crop, the weed value, and the characteristics of the underlying soil, including the current grade of the work machine, while the work machine travels along the underlying soil, wherein the cover crop distribution assembly: i) applies the cover crop seed if the current grade is greater than the grade threshold; ii) applies the weed killer if the weed value is greater than the weed value threshold; and iii) applies the fertilizer if the harvested crop yield amount is less than the yield threshold.

15. The method of claim 14, further wherein the characteristics of the harvested crop monitored by the controller through the sensing assembly are any of a yield or a grain quality.

16. The method of claim 14, further wherein the crop distribution assembly has a plurality of cover crop varieties, wherein the controller selects a cover crop variety from the plurality of cover crop varieties based on the characteristics of the harvested crop and the characteristics of the underlying soil, including the current grade of the work machine, before the manipulating the cover crop distribution assembly step.

* * * * *